United States Patent Office 3,149,181
Patented Sept. 15, 1964

3,149,181
POLYPROPYLENE STABILIZED WITH AN A-STAGE PARA-TERTIARY ALKYLPHENOL-FORMALDEHYDE RESIN AND A PHOSPHOROUS CONTAINING COMPOUND
George W. Warren, Columbus, Ohio, assignor to Union Carbide Corporation, a corporation of New York
No Drawing. Filed Apr. 28, 1960, Ser. No. 25,183
17 Claims. (Cl. 260—848)

This invention relates to improved propylene polymer compositions. More particularly, it relates to polypropylene having greatly increased resistance to light and thermal degradation and being substantially light in color.

Solid polypropylene is recognized in the plastics industry as possessing great commercial potential because of some advantages it has over polyethylene. For example, it has a higher melting temperature, a lower density and greater stiffness moduli than polyethylene. Polypropylene polymers can be produced in amorphous or crystalline form depending upon the catalysts employed and the reaction conditions. The highly crystalline polypropylenes having melt indices (measured at 190° C.) within the range of from about 0.01 to about 50 are particularly suitable for use in the production of fibers, films and other extruded and molded items. These high molecular weight, highly crystalline polypropylenes are characterized by their clarity, their high toughness and strength, their good mechanical resiliency, and their stiffness moduli.

Unfortunately, propylene polymers are subject to severe deterioration from the oxidative action of air at elevated temperatures. For example, fibers that are melt spun from polypropylene and have high initial strength, 4 to 5 grams per denier, lose about 50 percent of their strength within about 50 hours after being placed in a circulating air oven at 125° C., and tend to disintegrate completely within about 100 hours to a powdery material. The stability of unmodified crystalline polypropylene to heat aging also varies with the amount of impurities or catalyst residue remaining in the polymer, and in certain cases, the polymer is so unstable that fibers produced therefrom disintegrate within 5 to 10 hours at 125° C. This susceptibility of polypropylene to deteriorate under such conditions is much greater than that observed with most other high molecular weight polyolefin resins. This can be seen when one considers that unstabilized polyethylene fibers can withstand 500 hours at 100° C. without serious loss in strength.

While it is known that small amounts of some antioxidants, for example, 4,4'-thio-bis(6-tertiarybutyl-3-methylphenol), 2,2-bis(4-hydroxyphenyl)propane, diphenylamine, etc., can be added to polypropylenes to prevent degradative effects during the short period the polymer is heated for melt spinning to produce fibers, it is not possible by the use of these conventional and well known antioxidants to prevent the oxidative degradation that occurs over prolonged exposure to air at temperatures below the melting temperature of polypropylene. For example, the inclusion in a polypropylene fiber of two percent by weight of 4,4'-thio-bis(6-tertiarybutyl-3-methylphenol), which is known to be one of the most effective anti-oxidants for polyethylene, increases the time of exposure at 125° C. required to cause 50 percent loss in strength from 50 hours to only about 150 hours. It can be seen that this is still inferior to unstabilized polyethylene fibers.

Polypropylene can be stabilized against thermally induced degradation with a great variety of phenolic resins, among which are the uniquely effective p-tertiary alkylphenolformaldehyde resins. The so-stabilized polypropylene compositions are more resistant to air oxidation and thermal degradation during compounding and are able to endure the forming temperatures with no significant reduction of strength or electrical properties. However, relatively large concentrations, i.e., 0.1 to 1 percent or more are needed to provide the degree of stabilization generally required especially for fiber applications. Unfortunately, the phenolic resins impart a brownish-yellow color to the polypropylene. The higher the concentration of the phenolic resin the greater is the discoloration.

It is therefore the general object of the present invention to provide propylene resin compositions containing phenolic resin stabilizers which are even more stable toward light and thermal degradation than heretofore known and in addition are much improved with respect to color.

This general object as well as others which will be obvious from the specification and the appended claims is achieved by the compositions of the present invention which comprise a normally solid polymer of propylene, a p-tertiary-alkylphenol-formaldehyde resin stabilizer, and as a stabilizing synergist and decolorizer, a cyclic organic phosphite of the type fully described hereinafter.

The para-tertiaryalkylphenol-formaldehyde resins suitable for use in this invention are the A-stage resins produced by the reaction of para-tertiaryalkyl-phenols with formaldehyde in the presence of a catalyst. The A-stage of a phenol-formaldehyde resin is the early stage in the production of those thermosetting resins in which the product produced is still soluble in certain liquids and fusible. This stage in the production of thermosetting resins is distinguished from the B-stage and C-stage. The B-stage is an intermediate stage in the reaction of a thermosetting resin in which the product softens when heated and swells when in contact with certain liquids, but does not entirely fuse or dissolve. The C-stage is the final stage in the reactions of a thermosetting resin in which the material is relatively insoluble and infusible. Thermosetting resins in a fully cured state are in this stage.

The A-stage resins used as anti-oxidants in this invention are those produced by the reaction of para-tertiaryalkylphenols with formaldehyde in the presence of a suitable catalyst, such as oxalic acid, by procedures which are well known in the plastics art. Among the para-tertiaryalkylphenols which can be used in producing the suitable A-stage resins by reaction with formaldehyde are the para-tertiary alkylphenols, in which the alkyl group contains from 4 to about 20 carbon atoms or more, preferably from 4 to about 10 carbon atoms, such as para-tertiarybutylphenol, para-tertiaryamylphenol, para-tertiaryheptylphenol, para-tertiarynonylphenol and the like.

Illustrative of the A-stage resins that can be used to control the oxidative degradation of polypropylene are para-tertiarybutylphenol-formaldehyde resin, para-tertiary-amylphenol-formaldehyde resin, para-tertiarynonylphenol-formaldehyde resin, para-tertiarydodecylphenol-formaldehyde resin and the like. The resins can be prepared from the pure para-phenol or from a mixture of para phenol with the ortho and/or meta isomers. However, the effectiveness of the A-stage resins as anti-oxidants is dependent in very large measure upon the para-tertiaryalkylphenol content in the resin. Thus, even though an A-stage resin formed from a mixture of isomeric alkylphenols having a major proportion of the para isomer is an effective constituent of the present compositions, larger quantities of the A-stage resin are needed in order to have a sufficient concentration of the para-tertiaryalkyl-phenol-formaldehyde resin in the polypropylene to give equivalent stabilization to that achieved when a para-tertiarybutylphenol-formaldehyde resin produced from para-tertiarybutylphenol alone is utilized. Also, mixtures of two or more para-tertiaryalkylphenol-formaldehyde resins can be employed.

The cyclic organic phosphites which are suitably employed in the compositions of the present invention are represented by the general formula

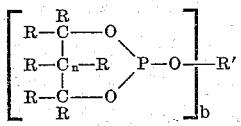

wherein $n$ has a value of from zero to 1 inclusive, $b$ is an integer from 1 to 2 inclusive, R is hydrogen or a monovalent hydrocarbon or substituted hydrocarbon radical containing up to about 10 carbon atoms, and R' is hydrocarbon or substituted hydrocarbon radical containing up to about 20 carbon atoms, and having a valence equal to $b$. Thus, for instance, R and R' can be alkyl, aryl, aralkyl, alkaryl or cycloalkyl and R' can be the corresponding divalent radicals such as alkylene, arylene, alkarylene, aralkylene, cycloalkylene, arylene dialkyl, or arylene alkyl. It is to be understood that any of the aforesaid radicals can contain halogen and/or hydroxyl substituents. Such substituents are not determinative of the decolorizing properties of the phosphorus compounds concerned in the compositions of the present invention.

Specifically illustrative, but in no way limitative of the phosphorus-containing compounds of this invention are ethylene phenyl phosphite, ethylene 2-chlorophenyl phosphite, ethylene 3-chlorophenyl phosphite, ethylene 4-chlorophenyl phosphite, ethylene 2,3-dichlorophenyl phosphite, ethylene 2,4-dichlorophenyl phosphite, ethylene 2,5-dichlorophenyl phosphite, ethylene 2,6-dichlorophenyl phosphite, ethylene 3,4-dichlorophenyl phosphite, ethylene 3,5-dichlorophenyl phosphite, ethylene 2-bromophenyl phosphite, ethylene 3-bromophenyl phosphite, ethylene 4-bromophenyl phosphite, ethylene 2-iodophenyl phosphite, ethylene 2-fluorophenyl phosphite, ethylene 2-chloro-4-bromophenyl phosphite, ethylene 2-methylphenyl phosphite, ethylene 3-methylphenyl phosphite, ethylene 4-methylphenyl phosphite, ethylene 3,5-dimethylphenyl phosphite, ethylene 2-ethylphenyl phosphite, ethylene 4-ethylphenyl phosphite, ethylene 2-hexylphenyl phosphite, ethylene 2-cyclohexylphenyl phosphite, ethylene 4-octylphenyl phosphite, ethylene 3-isobutylphenyl phosphite, ethylene 2-methoxyphenyl phosphite, ethylene 2-amylphenyl phosphite, ethylene 2-butylphenyl phosphite, ethylene 2-tertiary-butylphenyl phosphite, ethylene 2-secondary-butylphenyl phosphite, ethylene 2-phenylphenyl phosphite, ethylene alpha-naphthyl phosphite, 1-methylethylene phenyl phosphite, 1-methylethylene 2-chlorophenyl phosphite, 1,2-dimethylethylene phenyl phosphite, 1,2-dimethylethylene 3-chlorophenyl phosphite, 1-ethylethylene phenyl phosphite, 2-phenoxy-1,3,2-dioxaphosphorinane, 2-phenoxy-4,4-dimethyl-1,3,2-dioxaphosphorinane, ethyl-1,3,2-dioxaphosphorinane, 2-chlorophenyl-1,3,2-dioxaphosphorinane, ethyl-4,5-dibromo-1,3,2-dioxaphosphorinane, ethyl-4,5-dihydroxy-1,3,2-dioxaphosphorinane, tetramethylene diethylene diphosphite, o-phenylene diethylene diphosphite, and the like.

Preferred decolorizers are those which correspond to the general formula

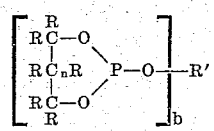

wherein $n$ is zero, $b$ is 1, R is either hydrogen or a lower alkyl radical containing from 1 to about 10 carbon atoms and R' is a monovalent saturated lower hydrocarbon radical. The term "lower hydrocarbon radical" is intended to mean either an aliphatic, cycloaliphatic, or aromatic hydrocarbon and the halogen and/or hydroxyl containing derivatives thereof which contain up to about 10 carbon atoms.

Particularly preferred decolorizers are those which correspond to the general formula

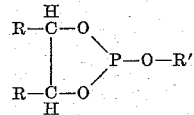

wherein R is either hydrogen or an alkyl group containing from 1 to 6 carbon atoms and R' is also an alkyl group containing from 1 to 6 carbon atoms.

All the phosphorus compounds employed in the compositions of the present invention are well known in the art and methods for their preparation are found in the chemical literature. For example, a diphosphite corresponding to the general formula

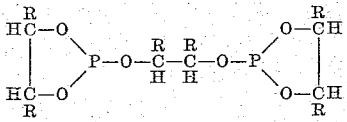

in which R is hydrogen or an alkyl group can readily be prepared by reacting 2 moles of a tertiary aromatic phosphite having the formula

where R is a halogen, hydrogen or hydrocarbon group with 3 moles of a glycol having adjacent hydroxyl groups such as ethylene glycol, 1,2-propylene glycol, or 3,4-hexylene glycol.

In another instance, 1,3,2-dioxaphospholaines having the general formula

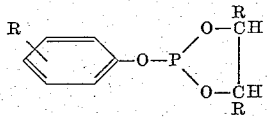

can be advantageously prepared by reacting in the presence of an acid binding agent such as pyridine, a primary aromatic dichloro phosphite and a glycol having adjacent hydroxyl groups.

Propylene resin compositions having vastly improved thermal stability without any significantly greater discoloration over compositions containing only a phenolic resin stabilizer are, according to this invention, those which contain from about 0.05 percent by weight to about 5.0 percent by weight or greater, preferably from about 0.5 to about 2.0 percent by weight, of an A-stage para-tertiaryalkylphenol-formaldehyde resin hereinbefore described, based on the weight of the propylene polymer present, and in combination therewith, an organic phosphite as hereinbefore described in an amount of from about 10 to about 600 percent, preferably from about 20 to about 200 percent, by weight based on the weight of the phenolic resin stabilizer present.

Whereas the proportion of A-stage phenolic resin to propylene polymer, and the proportion of the cyclic organic phosphite decolorizing agent to A-stage phenolic resin as set forth above are satisfactory to produce a stable product having a color sufficiently light for all but the most unusual use requirements, it is to be understood that greater or lesser amounts of the phosphite can be utilized without departing from the spirit and proper scope of the present invention. In a practical sense, however, greater latitude can be exercised with respect to the concentration of the phenolic resin than with the organic phosphite decolorizer.

The phenolic resin stabilizer and the cyclic phosphite decolorizer can be incorporated into the propylene polymer by any suitable and/or conventional means, as for example, by fluxing the propylene polymer with the stabilizer composition on heated rolls, by the use of a Banbury mixer, or of heated extruders.

The following examples will serve to further illustrate the present invention.

In the examples, at each occurrence the following definitions and characteriaztions apply unless otherwise indicated:

*Whiteness.*—Whiteness is indicated by the percentage reflectance on molded plaque samples using a wave length of 550 m$\mu$, and using vitrolite as the arbitrarily chosen reflectance standard. The color which develops in a polypropylene composition such as those tested is related directly to the whiteness value, i.e., the higher the percenage reflectance, the whiter the composition. The improvement in color in any of the polypropylene compositions containing a phenolic resin stabilizer and a phosphorus-containing compound of the present invention is readily appreciated by comparison of the whiteness value thereof with whiteness values of compositions containing the same propylene resin and phenolic stabilizer, but containing none of the instant decolorizers.

*Polypropylene resin.*—The propylene homopolymer employed is a typical normally solid polypropylene having a melt index of 3.1 decigrams per minute, a density of 0.908 gram per milliliter at 23° C. and a tensile modulus of 138,000 pounds per square inch.

*Phenolic stabilizer.*—An A-stage p-tert-butylphenol-formaldehyde resin having a softening point of 266° F. and a specific gravity of 1.04. The resin was prepared by the oxalic acid catalyzed condensation of p-tert-butyl-phenol and formaldehyde under reflux conditions. The condensation product mass was then vacuum distilled to remove formed water, unreacted phenol, and low molecular weight condensation products, and thereafter cooled and ground.

*Oxidative resistance.*—The ability of the propylene composition to resist oxidative degradation in air at elevated temperatures. The compositions of the present invention were, according to conventional procedure, melt spun into uniform filaments of about 125 denier. A number of these filaments were taken together to form a yarn or multifilament fiber, a portion of which was then tested on a Scott IP-2 tester for fiber tenacity using a 10 inch gauge length. The remaining portion was wrapped on a wire rack and placed in an air oven at 125° C. At intervals thereafter, five 5″ gauge lengths were removed from the oven and tested on the Scott IP-2 tester. With increasing oxidation the tenacity of the filaments of the yarn decreased until no significant tensile force could be applied without rupture of the yarn. The oven induction period required to accomplish this result is indicative of the effectiveness of the stabilizer additives present.

EXAMPLES 1–7

The substantially enhanced thermal stability and improved color of the polypropylene composition of the present invention was demonstrated by preparing a series of polypropylene compositions containing both a phenolic resin stabilizer and a phosphorus compound. For control the same polypropylene was admixed with the same p-tert-butylphenol-formaldehyde resin to form two compositions, one containing 0.5% by weight of the phenolic resin and the other containing 1.0% by weight. Each of the compositions prepared was heat blended on a sheet of polytetrafluoroethylene heated to 220° C. The compositions were removed from the polytetrafluoroethylene sheet after having achieved the molten state for a period of 1 minute. The results of all tests are reported in Table I below:

*Table I*

| Ex. | Polypropylene Composition | | Oxidative Resistance [b] | Whiteness Value |
|---|---|---|---|---|
| | Additive | Conc. of Additives [a] | | |
| Control | None | | 4 | 46 |
| | p-t-Butylphenol/CH$_2$O resin | 0.5 | 180 | |
| 1 | p-t-Butylphenol/CH$_2$O resin | 1.0 | 300 | 19 |
| | 2-hydroxyethyl ethylene phosphite | 1.0 | | |
| 2 | Phenyl ethylene phosphite | 1.0 | 412 | 40 |
| | p-t-Butylphenol/CH$_2$O resin | 1.0 | | |
| 3 | Cresyl ethylene phosphite | 1.0 | 412 | 41 |
| | p-t-Butylphenol/CH$_2$O Resin | 1.0 | | |
| 4 | Decyl ethylene phosphite | 1.0 | | 38 |
| | p-t-Butylphenol/CH$_2$O resin | 1.0 | | |
| 5 | Phenyl propylene phosphite | 1.0 | | 37 |
| | p-t-Butylphenol/CH$_2$O resin | 1.0 | | |
| 6 | 2-phenoxy-4,4,6-trimethyl-1,3,2 dioxophosphorinane | 1.0 | | 35 |
| | p-t-Butylphenol/CH$_2$O resin | 1.0 | | 31 |
| 7 | Triethylene diphosphite | 1.0 | | |
| | p-t-Butylphenol/CH$_2$O resin | 1.0 | | 32 |

[a] Percent by weight based on the weight of polypropylene.
[b] Induction period at 125° C. in air, hrs.

EXAMPLE 8

The effect of various concentrations of phosphorus compound and phenolic resin on the whiteness value of the polypropylene compositions was determined using the same propylene polymer, phenolic resin stabilizer and test methods as in Examples 1–7. As the phosphorus-containing compound 2-hydroxyethyl ethylene phosphite was employed in amounts varying from 0.5 to 3.0 percent by weight based on the weight of the polypropylene. The whiteness values for a number of combinations are set forth below in Table II.

*Table II*

| Whiteness | Concentration of (weight percent)[1] | |
|---|---|---|
| | 2-Hydroxyethyl-1,3,2-dioxaphospholane | Tert-butylphenol formaldehyde resin |
| 46.0 | 0 | 0 |
| 25.0 | 0 | 0.5 |
| 19.0 | 0 | 1.0 |
| 11.0 | 0 | 2.0 |
| 8.0 | 0 | 3.0 |
| 8.0 | 0 | 4.0 |
| 41.2 | 0.5 | 2.0 |
| 44.5 | 2.0 | 2.0 |
| 43.8 | 3.0 | 2.0 |
| 43.0 | 0.5 | 0.5 |
| 44.8 | 2.0 | 0.5 |
| 45.8 | 3.0 | 0.5 |

[1] Based on the weight of polypropylene.

As indicated in the above table, the color improvement shown by these particular color-improving agents is not influenced greatly gy large concentration differences in either the phenol-formaldehyde resin or the color improving agent.

The polypropylene compositions of the present invention find particular utility, because of their resistance to oxidation degradation and discoloration as extruded or spun textile fibers and yarns. These compositions find additional utility in the form of films and sheets suitable for packaging, and in the form of a wide variety of extruded and molded articles. The propylene resins effectively stabilized by the stabilizer compositions of the present invention include copolymers of propylene and other olefinically unsaturated monomers such as ethylene and propylene provided the propylene interpolymerized therein is present in an amount of at least about 50 percent by weight, preferably at least about 80 percent by weight. The term "propylene resin" or "propylene polymer" as used herein is intended, therefore, to include such copolymers as well as propylene homopolymers.

The composition can also include conventional additives such as colorants, lubricants, slip agents, plasticizers, fillers and the like, and can be admixed with other polymeric materials, either compatible or incompatible with polypropylene.

What is claimed is:

1. A propylene resin composition having improved stability toward heat and light induced molecular degradation and being stable toward color development which comprises a normally solid propylene polymer, a stabilizing amount of an A-stage para-tertiaryalkylphenol-formaldehyde resin in which the alkyl group of the para-tertiaryalkylphenol contains from 4 to 20 carbon atoms, and a decolorizing amount of a phosphorus-containing compound having the general formula

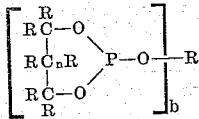

wherein $n$ has a value from zero to 1 inclusive, $b$ is an integer from 1 to 2 inclusive, each R is individually selected from the group consisting of hydrogen and a monovalent hydrocarbon radical containing from 1 to 10 carbon atoms, and R' is a hydrocarbon radical containing up to about 20 carbon atoms and having a valence equal to the value of $b$.

2. The composition of claim 1 wherein the alkyl group of the para-tertiaryalkylphenol contains from 4 to 10 carbon atoms.

3. The composition of claim 2 wherein the A-stage para-tertiaryalkylphenol-formaldehyde resin is present in an amount of from about 0.05 to about 5.0 percent by weight of the propylene polymer, and wherein the phosphorus-containing compound is present in an amount of from about 10 to about 600 percent by weight based on the weight of the A-stage phenolic resin.

4. The composition of claim 3 wherein the phosphorus-containing decolorizer is present in an amount of from about 20 to about 200 percent by weight based on the weight of the A-stage phenolic resin stabilizer.

5. The composition of claim 3 wherein the phosphorus-containing compound is 2-hydroxyethyl ethylene phosphite.

6. The composition of claim 3 wherein the phosphorus-containing compound is phenyl ethylene phosphite.

7. The composition of claim 3 wherein the phosphorus-containing compound is decyl ethylene phosphite.

8. The composition of claim 3 wherein the phosphorus-containing compound is 2-phenoxy-4,4,6-trimethyl-1,3,2-dioxaphosphorinane.

9. The composition of claim 3 wherein the phosphorus-containing compound is triethylene diphosphite.

10. The stabilized resin composition according to claim 3 wherein $n$ is zero, $b$ is one, R is hydrogen and R' is a saturated monovalent aliphatic hydrocarbon radical containing from 1 to 10 carbon atoms.

11. The stabilized resin composition according to claim 3 wherein $n$ is zero, $b$ is one, R is hydrogen and R' is a monovalent aryl radical containing up to 10 carbon atoms in the nucleus thereof.

12. The stabilized resin composition according to claim 3 wherein $n$ is zero, $b$ is one, R is an alkyl group of 1 to 10 carbon atoms and R' is a saturated monovalent aliphatic hydrocarbon radical containing from 1 to 10 carbon atoms.

13. The stabilized resin composition according to claim 3 wherein $n$ is zero, $b$ is one, R is an alkyl group of 1 to 10 carbon atoms and R' is a monovalent aryl radical containing up to 10 carbon atoms in the nucleus thereof.

14. The stabilized resin composition according to claim 3 wherein $n$ is zero, $b$ is two, R is hydrogen and R' is a divalent arylene radical containing up to 10 carbon atoms in the nucleus thereof.

15. The stabilized resin composition according to claim 3 wherein $n$ is zero, $b$ is two, R is hydrogen and R' is a divalent alkylene radical of 1 to 10 carbon atoms.

16. The stabilized resin composition according to claim 3 wherein $n$ is zero, $b$ is one, R is hydrogen and R' is an alkyl group of 1 to 6 carbon atoms.

17. The stabilized resin composition according to claim 3 wherein $n$ is zero, $b$ is one, R is an alkyl group of 1 to 6 carbon atoms and R' is an alkyl group of 1 to 6 carbon atoms.

References Cited in the file of this patent

UNITED STATES PATENTS

| | | |
|---|---|---|
| 2,163,637 | Thomas | June 27, 1939 |
| 2,240,582 | Sparks | May 6, 1941 |
| 2,834,798 | Hechenbleikner et al. | May 13, 1958 |
| 2,839,563 | Hechenbleikner | June 17, 1958 |
| 2,841,608 | Hechenbleikner et al. | July 1, 1958 |
| 2,968,641 | Roberts et al. | Jan. 17, 1961 |
| 2,985,617 | Salyer et al. | May 23, 1961 |
| 3,013,003 | Maragliano et al. | Dec. 12, 1961 |
| 3,020,259 | Schulde et al. | Feb. 6, 1962 |

UNITED STATES PATENT OFFICE
CERTIFICATE OF CORRECTION

Patent No. 3,149,181 September 15, 1964

George W. Warren

It is hereby certified that error appears in the above numbered patent requiring correction and that the said Letters Patent should read as corrected below.

In the heading to the printed specification, lines 4 and 5, for "PHOSPHOROUS" read -- PHOSPHORUS --; column 4, line 32, for "1,3,2-dioxaphospholaines" read -- 1,3,2-dioraphospholanes --; column 5, line 4, for "characteriaztions" read -- characterizations --; column 6, line 3, for "composition" read -- compositions --; column 7, lines 33 to 37, the formula should appear as shown below instead of as in the patent:

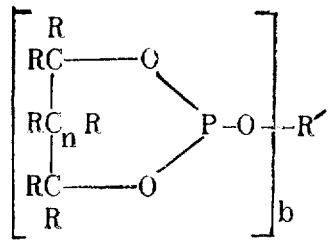

Signed and sealed this 12th day of January 1965.

(SEAL)
Attest:

ERNEST W. SWIDER
Attesting Officer

EDWARD J. BRENNER
Commissioner of Patents